US005520776A

United States Patent [19]
Van Allen et al.

[11] Patent Number: 5,520,776
[45] Date of Patent: May 28, 1996

[54] METHOD AND APPARATUS FOR DELAMINATING A LAMINATE

[75] Inventors: David E. Van Allen, Malden; Richard A. Rosenthal, Winchester; George D. Whiteside, Lexington, all of Mass.

[73] Assignee: Polaroid Corporation, Cambridge, Mass.

[21] Appl. No.: 241,149

[22] Filed: May 10, 1994

[51] Int. Cl.⁶ .................................................. B32B 35/00
[52] U.S. Cl. ...................... 156/584; 156/344; 271/280; 271/285; 430/256
[58] Field of Search .................................. 156/344, 584; 271/280, 281, 285, 900; 354/354; 355/277, 278, 279, 311, 315; 430/256, 257, 258, 259, 260, 261, 262

[56] References Cited

U.S. PATENT DOCUMENTS

| | | | |
|---|---|---|---|
| 3,266,797 | 8/1966 | Stievenart | 271/64 |
| 3,572,693 | 3/1971 | Larsen et al. | 271/60 |
| 4,508,589 | 4/1985 | Tarui et al. | 156/584 |
| 4,670,085 | 6/1987 | van der Meer et al. | 156/584 |
| 4,724,032 | 2/1988 | Kay | 156/344 |
| 4,867,837 | 9/1989 | Seki et al. | 156/584 |
| 4,880,488 | 11/1989 | Matsuo et al. | 156/344 |
| 4,898,376 | 2/1990 | Sumi | 271/272 |
| 4,961,817 | 10/1990 | Seki | 156/584 |
| 4,989,036 | 1/1991 | Wilson | 355/106 |
| 5,000,816 | 3/1991 | Seki et al. | 156/584 |
| 5,018,719 | 5/1991 | Wilson et al. | 271/246 |
| 5,141,584 | 12/1992 | Binder | 156/344 |
| 5,155,003 | 10/1992 | Chang | 430/200 |
| 5,169,474 | 12/1992 | Binder | 156/344 |
| 5,169,475 | 12/1992 | Tobin | 156/344 |
| 5,169,476 | 12/1992 | Silveira et al. | 156/344 |
| 5,200,297 | 4/1993 | Kelly | 430/253 |
| 5,203,942 | 4/1993 | DeCook et al. | 156/230 |
| 5,232,216 | 8/1993 | Bybee | 271/228 |
| 5,292,115 | 3/1994 | Egi et al. | 271/122 |

FOREIGN PATENT DOCUMENTS 61-27853  2/1986  Japan.
63-127944  5/1988  Japan.

OTHER PUBLICATIONS

Shuey, David R., "An Improved Paper Feeding and Registration System," *Xerox Disclosure Journal*, Jul./Aug. 1980, vol. 5, No. 4, p. 389.

*Primary Examiner*—Mark A. Osele
*Attorney, Agent, or Firm*—Leslie Payne

[57] ABSTRACT

A method and apparatus for separating layers of a laminated thermographic media is disclosed. The apparatus has a torque roll cooperating with a pair of peel rolls which breaks a tab on the media without a hard stop thereby avoiding shock induced premature delamination. After the media is initially delaminated, a deflector roll operable independently of the peel rolls engages the backside of the substrate for establishing a deflector angle. An anti-skew system is also incorporated for aligning the media with the torque roll and peel rolls.

26 Claims, 3 Drawing Sheets

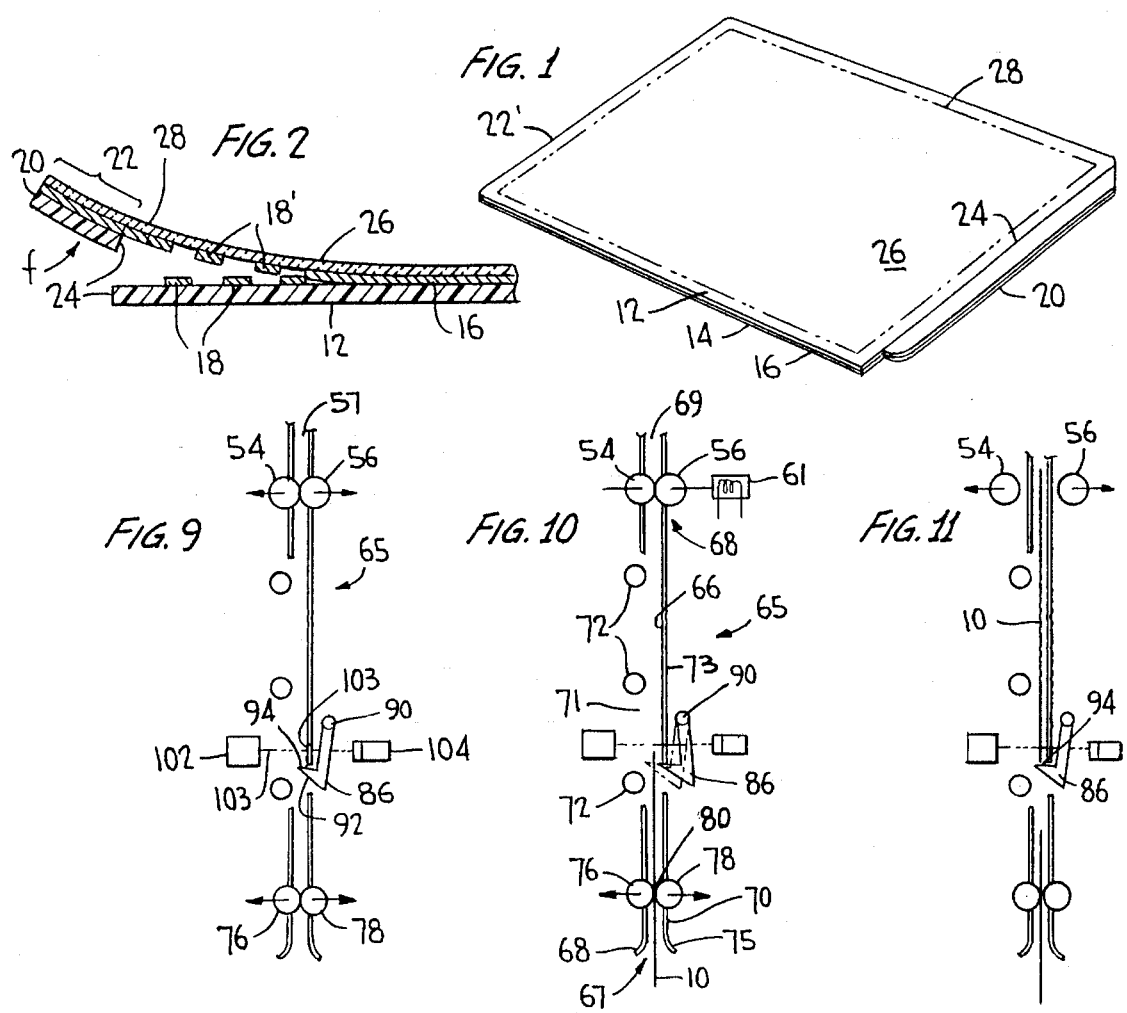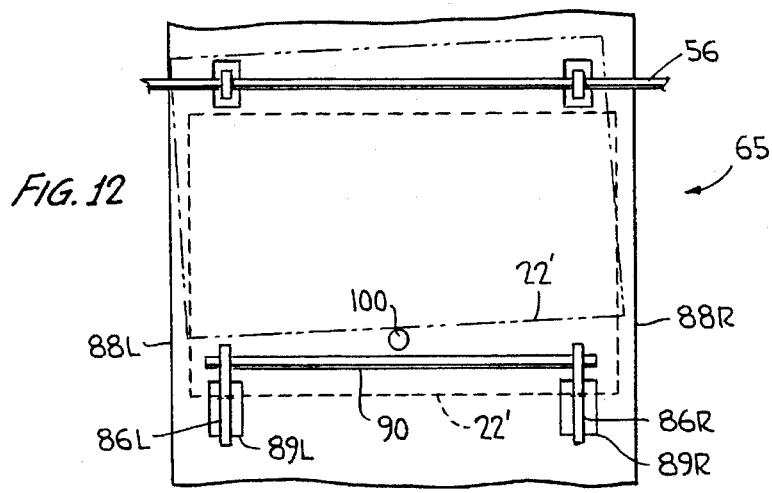

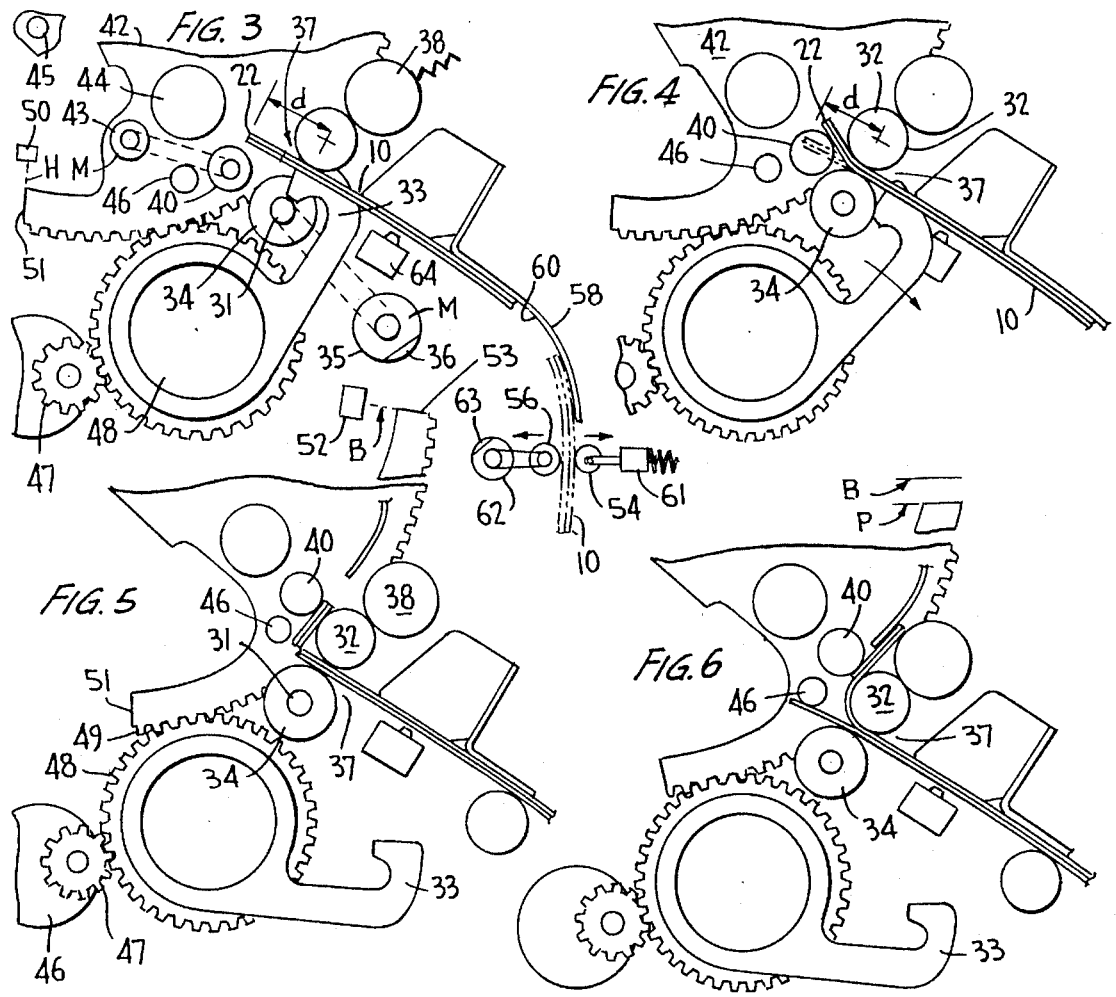
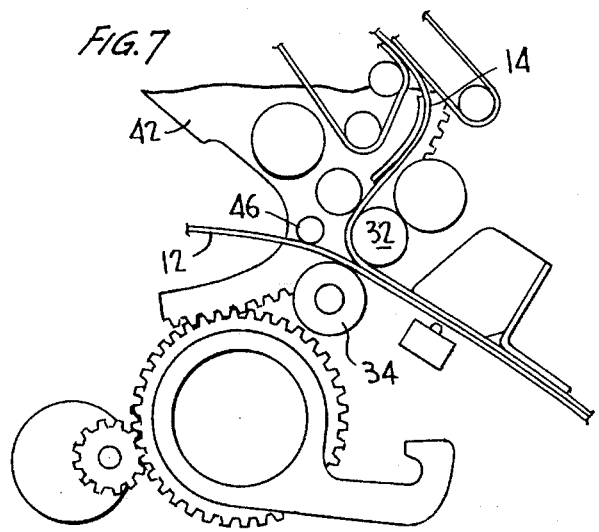

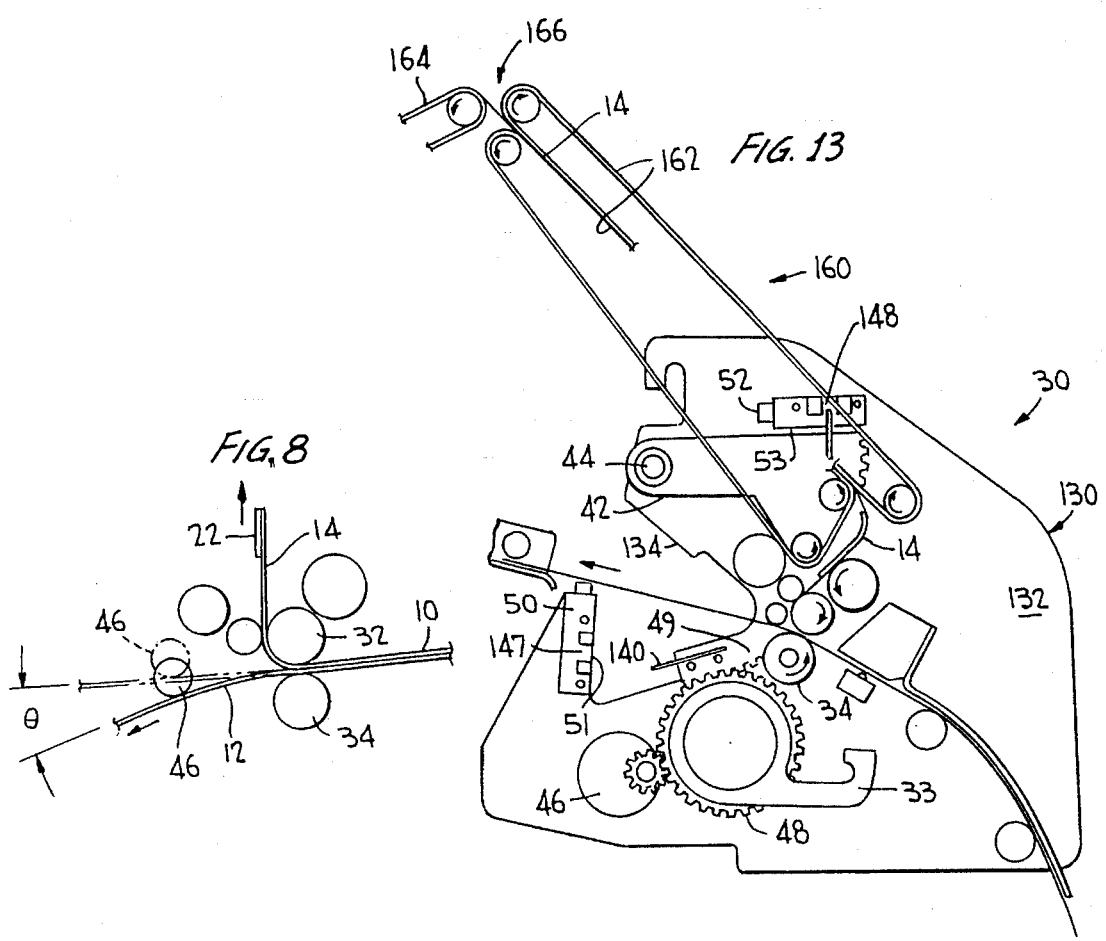

METHOD AND APPARATUS FOR DELAMINATING A LAMINATE

BACKGROUND OF THE INVENTION

The present invention relates to a delamination apparatus and method, and more particularly to an apparatus and method for delaminating a composite sheet structure comprising a plurality of selectively releasable superposed sheets. Delamination in the sense used in the present invention is to be understood as meaning a process for separating a peel sheet from a substrate joined by a multicomponent image forming and adhesive intermediate layer. The substrate has a frangible score line forming a tab attached to the peel sheet.

There are a number of known systems for the separating layers of laminated film for rendering a developed image visible. Such systems are commonly used in connection with so-called peel apart film units. Some systems use a blade insertable between two layers of film fixed to the periphery of a rotating drum. See, for example, U.S. Pat. No. 4,670,085. U.S. Pat. No. 5,141,584 discloses an arrangement for delaminating a laminate wherein the direction of travel of the laminate is reversed to break a frangible layer.

In general, prior systems may be characterized as providing peeling action, for instance, removal of one layer from the other. Such apparatus and methods, however, while effective under certain conditions have shortcomings which the present invention seeks to obviate. For example, the film or laminate may become scratched or damaged during the peeling and handling process. Many known systems involve mechanisms which require complex motions and thus suffer from certain inefficiencies in the materials handling aspects of this technology. Also, some of the known systems employ arrangements where the film laminate encounters a hard stop or an abutment which may cause a shock induced premature or uncontrolled delamination. As a result, undesirable visual artifacts may appear in the image area.

SUMMARY OF THE INVENTION

The present invention is based upon the discovery that a film laminate having a scored substrate surface forming a frangible tab portion attached to a peel sheet overlying a substrate is captured between a nip of a pair of peel rolls along an initial path with the tab precisely located at a selected initial position relative to the nip without employing a hard stop. A rotatable tab breaking roll carried by a rotatable frame gently engages the tab from the scored side and urges the tab against one of the peel rolls in order to initiate separation of the tab from the substrate. Thereafter, the peel rolls advance the substrate by a selected amount while the tab breaking roll and peel roll advance the peel sheet. A deflector roll carried on the frame engages the substrate from the side opposite the score line to deflect the substrate from the initial path to a deflected path whereby there is established a selected deflection angle between the initial path of the substrate and the diverted path to facilitate a controlled separation of the peel sheet and substrate. In a particular arrangement, the film direction is always downstream and tab breaking and peel initiation occurs downstream of the peel nip.

In a particular embodiment, a lower peel roll and an upper peel roll are disposed in spaced relationship and are mounted for movement towards and away from each other, establishing a peel nip when engaged. The film is directed, with the tab end leading, along an initial path between the spaced peel rolls to a selected position, and the peel nip is closed on the film. A tab engaging roll and a deflector roll are disposed one adjacent the other on a movable frame for movement along a path beginning at a first or home position on one side of the film. The frame carryies the tab engaging roll against the tab and one of the peel rolls causing the tab to break along the score line.

Drive means is provided for moving the film forwardly along the initial path by a selected amount. Drive means is also provided for rotating the tab engaging roll with constant torque while the lower peel roll is driven in the forward direction so that the peel sheet is moved away from the substrate between the torque and the upper peel roll. In such position, the deflector roll carried by the frame is disposed on the same side of the substrate as the torque roll for engaging the substrate opposite the scored side and stressing it into a diverted path away from the peel sheet when the frame is reversed. The substrate is deflected at a selected deflection angle.

Means is provided for aligning the film with the upper and lower peel rolls. An alignment mechanism includes an infeed chute having an inlet and an outlet comprising a panel and longitudinally spaced apart idler rollers in spaced relation with the panel defining a film path. A pair of cams, one each located near a marginal edge of the infeed chute spans the film path. The leading edge of the film entering the infeed chute causes the cams to be deflected out of the film path. A pair of infeed drive rollers mounted for relative motion with respect to each other form a nip for receiving the sheet therebetween. The infeed drive rollers draw the film sheet through the infeed chute until the trailing edge passes the cams which are released so as to again span the infeed chute. Optical sensor means downstream of the cams near the inlet of the infeed chute senses the trailing edge of the sheet causing the infeed rollers to separate whereby the sheet is released and falls by gravity. The cams have a support surface facing the downstream direction for engaging the trailing edge of the sheet as it is released by the infeed rolls. When the sheet comes to rest against the support surface of the cams, and when the trailing edge of the sheet blocks the optical detector, the infeed rolls reengage the sheet to drive it forward with the leading edge of the sheet parallel to the corresponding axes of the upper and lower peel rolls.

In accordance with another feature of the invention the tab engaging roll is operated with a constant torque so as to place a constant force on the peel sheet as it separates from the substrate. The lower drive roll is driven at a constant speed. The deflector roll enhances the tendency of the peel sheet to separate from the substrate by placing the substrate at a selected angle with respect to the peel sheet.

A sensor positioned in the path between the infeed rollers and the upper and lower peel rollers senses the leading edge of the sheet and provides a control signal for positioning the leading edge of the sheet at a selected position in the path of the tab engaging roll downstream of the peel roll nip. The infeed rolls maintain the positionment of the leading edge until the peel nip closes.

A peel sheet transport is provided to provide means for disposing of the peel sheet after separation from the substrate. A frame sensor senses the approach of the fram to an abutment and declerates the frame drive to effect a soft stop thereagainst.

BRIEF DESCRIPTION OF THE DRAWINGS

FIG. 1 is a perspective view of a laminate film which is to be delaminated by the apparatus according to the present invention;

FIG. 2 is a side sectional elevation of the laminate of FIG. 1 depicting certain aspects of its delamination characteristics with thicknesses of several layers and margins of various axes exaggerated for clarity;

FIGS. 3–7 are fragmentary, schematic side elevations of the apparatus according to the present invention, with supporting structures eliminated for clarity, depicting a sequence of operations for delaminating a composite laminate film;

FIG. 8 is a detail schematically showing the diverter angle geometry;

FIGS. 9–12 are schematic illustrations of a de-skew mechanism according to the present invention; and FIG. 13 is a more detailed illustration of the apparatus including the peel sheet transport mechanism.

DESCRIPTION OF THE INVENTION

Referring to FIGS. 1 and 2, a laminate film 10 is shown in an exemplary embodiment as a thermal imaging film unit of the general kind comprising, for example, a thermographic film medium 10 formed of a substrate 12 and an overlying disposable peel sheet 14 adhesively connected by an intermediate multicomponent image forming layer 16. Image forming layer 16 generally comprises a pigment material such as carbon black and a binder therefor. The image forming layer may comprise a composite of several layers conducive to forming an image of desirably high resolution and optical density as a result of thermal exposure and subsequent processing, including delamination as provided by the invention. Lamination of sheet 14 onto the coated sheet 12 provides the laminar composite sheet structure of the film 10. A thermographic laminate of the foregoing general type is commercially available from Polaroid Corporation and is also described broadly in commonly assigned U.S. Pat. Nos. 5,155,003 and 5,200,297.

In the laminar composite sheet structure of FIGS. 1 and 2, the adhesive bond between substrate sheet 12 and image forming layer 16 is, in its initial unexposed state, greater than the bond strength between peel sheet 14 and image forming layer 16. As a result of exposure, the bond between exposed portions of image forming layer 16 and substrate 12 becomes stronger than the bond existing between peel sheet 14 and the portions of image forming layer 16 not exposed to heat. Abutting portions of image forming layer 16 are, thus, caused by thermal exposure to be adherent to substrate 12 at bond strengths less than and greater than the uniform bond strength between image forming layer 16 and peel sheet 14. As a result of laser exposure, portions of image forming layer 16 become more firmly bonded to substrate 12.

For purposes of the invention, it is sufficient to note that the image forming layer 16 is such that upon exposure it may be ruptured in the direction generally normal to its two surfaces along lines defined by exposure to thermal energy. Portions of the layers 16 subjected to exposure can then be separated from portions not affected by exposure to thus provide complementary images on the respective substrate and peel sheets 12 and 14 of the film 10. The complementary images 18 and 18' are represented by the broken portions of the layer 16 illustrated in FIG. 2.

The film 10 has an image area 26 and a margin area 28. According to a feature of the invention means is provided to initiate delamination in the margin area 28 in order to prevent observable artifacts in the image area 26.

To facilitate separation of the layers 12 and 14, a frangible tab 22 is provided. The adhered layers 12 and 14 are connected together by the frangible tab 22 formed near an edge 20 along a score line 24 in the substrate 12. A force f directed at the tab 22 from the free surface of the substrate 12 puts such surface of the substrate 12 into tension causing failure along the score line 24 so that the substrate 12 may be separated from the peel sheet 14, as illustrated in FIG. 2.

FIGS. 3–7 schematically illustrate an apparatus or peeler 30 according to the invention, for automatically separating the peel sheet 14 from the substrate 12. The drawings are in sequence, for example, in FIG. 3, the peeler 30 is illustrated in the home position (H) with the film 10 in an initial position. In FIG. 4, the peeler 30 is shown moving from the home position H to the break position (B). In FIG. 5, the peeler 30 is in the break position. FIG. 6 illustrates the sheet feed sequence and FIG. 7 illustrates the peeler 30 in the peel position P with a portion of the peel transport mechanism illustrated. FIG. 8 is a schematic illustration of the deflection angle geometry.

Referring to FIG. 3, the peeler 30 generally comprises a pair or upper and lower peel rolls 32 and 34. The lower peel roll 34 is driven by a constant speed motor 35 which may be governed by an encoder to facilitate speed and position control in a known manner (shown only in FIG. 3). The upper peel roll 32 and the lower peel roll 34 are mounted for relative motion towards and away from each other. When in the home position (H), shown in FIG. 3, the peel rollers 32 and 34 are separated by a space 36 for loosely receiving the film 10 therein. For example, the lower peel roll 34 is mounted on a spring loaded shaft 31 which is shown secured in position by peel roll cam 33. When the cam 33 is moved out of engagement with shaft 33, the lower peel roll 34 is free to move into engagement with the upper peel roll 32. When engaged, (FIG. 4), they form a closed nip 37 capturing the film 10 therebetween. A backing roller 38 supports the upper peel roll 32 against deflection by the force of engagement of the respective upper and lower peel rolls 32 and 34. The upper peel roll 32 and its backing roller 38 are spring loaded by a suitable spring mechanism.

A torque or tab breaking roll 40 is mounted for relative motion with respect to the upper peel roll 32 for engaging the tab 22, as discussed hereinafter. In the particular embodiment illustrated, the torque roll 40 is mounted on a rotatable frame 42. In particular, the torque roll is spring biased and movable in a slot (not shown) formed in the roller frame. As the roller frame moves so does the torque roll move relative to the upper and lower peel rolls 32 and 34. The torque roll 40 is driven, such as by a gear arrangement, belt system, or the like by a constant torque motor 43 (schematically shown only in FIG. 3) which is carried by the roller frame 42. Like the constant speed motor 35, the motor 43 may employ an encoder for speed and position control. A spring biased backing roller 44 supports the torque roll 40 against deflection caused by forces exerted against it. The torque roll 40 and its corresponding backing roller 44 are spring loaded.

A deflector roll 46 is mounted on the frame 42 in spaced relationship with the torque roll 40. The deflector roll 46 moves with the torque roll 40 for engaging the substrate after the tab is separated therefrom.

In the exemplary embodiment, frame 42 is mounted for rotation about a pivot support 45 between the home position H (FIG. 3) and the brake position B (FIG. 5). A home position sensor 50 senses when the frame 42 is in the home position. Home position sensor is mounted on a frame, not shown, and has an abutment or stop 51 asociated therewith for engagment with the roller frame 42. Likewise, frame mounted break position sensor 52 senses when the frame is in the brake position B. Its associated abutment 53 provides a fixed stop for the roller frame 42 and establishes a reference position. The frame 42 is driven between the home H and brake B positions by a reversible, encoded, constant speed motor 45 via a pinion 47, an intermediate cam gear 48, which carries cam gear 33, and a sector gear 49 on the frame 42. The motor 46 is responsive to a control signal provided by sensors 50 and 52 for accurate positioning of the frame 42 throughout the operation of the system.

It should be understood that the various rolls described herein and the roller frame are mounted on parallel axes. Also, the lower peel roll 34 and the torque roll 40 have an elastomeric coating to enhance transport of the film 10 and the peel sheet 14.

A pair of spring biased open peeler infeed rolls 54 and 56 are mounted upstream of the upper and lower peel rolls 32 and 34. A deflector panel 58 is disposed between the peeler infeed rolls 54–56 and the upper and lower peel rolls 32 and 34 for directing the flexible film 10 along a first feed path 60.

The peeler infeed rolls 54 and 56 are movable relative to each other by means of a solenoid actuator. When engaged, the peeler infeed rolls 54 and 56 form a nip 57 for capturing the film 10 therebetween. A constant speed motor 62 having an encoder 63 is operatively coupled to the infeed rollers 54 and 56 for driving the film 10 via the deflector 58 between the separated upper and lower peel rolls 32 and 34. The motor 62 is controlled to position the leading edge 20 of the film 10 in a precise position, as set forth below.

A tab sensor 64 is located upstream of the open nip 36 between the upper and lower peel rolls 32 and 34 (FIG. 3). The encoder 63 on constant speed motor 62 is electrically responsive to the sensor 64. As the leading edge 20 of the film 10 passes the sensor 64, the encoder 63 counts a selected number of steps for the stepping motor 62 whereby the peeler infeed rolls 54 and 56 are driven by a given amount. At some selected number of counts, the motor 52 driving the peeler infeed rolls 54 and 56 stops. Thus, in accordance with the invention, the leading edge 20 of the film is positioned at some distance d downstream of the nip 37 formed between the peel rolls 32 and 34. This operation places the tab 22 in opposition to the torque roll 40, see FIGS. 3 and 4. The number of counts may be adjusted to selectively position the leading edge 20 of the film in the path of the torque roll 40.

It should be understood that the peeler infeed rolls 56 and 58 remain engaged until the nip 37 between the upper and lower peel rolls 32 and 34 closes. By maintaining the infeed rolls engaged in this way, the precise positioning of the leading edge 20 of the film with respect to the nip 37 is maintained at all times.

In addition to precisely locating the leading edge 20 of the film 10 as described above, it is important to orient the leading edge 20 parallel to the closed nip 37 (FIG. 4). Accordingly a de-skewing mechanism 65 is employed. The de-skew mechanism 65, shown in FIGS. 9–12, is associated with a peeler infeed chute 66 having an inlet 67 and an outlet 69. The inlet end 67 comprises a pair of confronting spaced apart inboard and outboard panels 68 and 70 having a flared end 75. The inboard panel 68 extends partway up the chute 66 leaving an open access area 71 which facilitates jam clearance. The outboard panel 70 extends to the outlet 68. A plurality of longitudinal rows of spaced apart idler rollers 72 are located along the access 71 in spaced relation with the panel for establishing the guide path 73 for the film 10. A pair of feed rolls 76 and 78 are located upstream of the inlet 67 and engage to form a nip 80. The infeed rolls 76 and 78 are driven by a constant speed motor, not shown. The feed rolls are retractable.

A pair of spaced apart spring loaded cams 86L and 86R are located inboard of the corresponding marginal edges 88L and 88R of the outboard panel 70. The designations L and R refer to left and right sides and are used only when necessary for clarity. Slotted openings 89R and 89L are formed in the panel 70 accommodate the corresponding cams 89L an 89R (FIG. 12). The cams 86 are each mounted for rotation into and out of the slot openings 89 along a generally horizontal pivot shaft 90. The cams are spring biased towards the openings 89 and each cam 86 has a lower cam surface 92 and an upper trailing edge support surface 94 which span across the path 73.

The cams 86 are normally positioned as shown with the cam surface 92 in the path 73 of the film 10. An optical trailing edge sensor 100 is positioned upstream of the cams 86. In an exemplary embodiment, the optical trailing edge sensor 100 comprises a light source 102 and a light detector 104 and an aligned aperture 103 in the panel 70 to establish a sensor light path across the film path 73.

The peeler infeed rolls 54 and 56 are located at the outlet 68 of the chute 66. The sensor 100 is operatively coupled to the solenoid 61 which controls the positioning of the rolls 54 and 56.

In operation, the infeed rollers 76 and 78 drive the film 10 into the inlet 67 of the infeed chute 66 (FIG. 9). The film 10 is driven forward causing the leading edge 20 to engage and deflect the cams 86 out of the path 73 (FIG. 10). As the film is driven further into the infeed chute, the leading edge 20 is captured in the closed nip 62 of the peeler infeed rolls 54 and 56 (FIG. 10). The rollers 54 and 56 draw the film upwardly through the infeed chute 66 until the trailing edge 22' of the film 10 clears the cams 86, whereupon the cams 86 then resume their biased position. The peeler infeed rolls 54 and 56 continue to pull the film 10 forward until the trailing edge 22' clears the optical sensor 100. When this happens, the optical sensor 100 causes the solenoid 61 to separate the peeler infeed rolls 54 and 56 thereby allowing the film 10 to drop by gravity back into the infeed chute 66 (FIGS. 11 and 12). As a result, the film falls back onto the trailing edge support surfaces 94 of the cams 86 and 88. This assures that the film 10 is square within the infeed chute 66.

When the trailing edge 22' of the film blocks the light path 103 of the optical sensor 100, the peeler infeed rolls 54 and 56 reengage, resuming operation and driving the film 10 towards the nip 36 between the upper and lower peel rolls 32 and 34. It should be understood that the response of the solenoid 61 to the sensor 100 may be selectively controlled by a suitable programmable controller, not shown, so that as the film 10 is withdrawn from the infeed chute 66 after de-skewing, the infeed rollers 54 and 56 do not cycle open and closed.

Reference is again directed to FIGS. 3–8, to further describe the gentle tab breaking feature of the invention. In FIG. 3, the frame 42 is at rest in the home position H; the film 10 has been precisely positioned in the open nip between the upper and lower peel rolls 32 and 34; and the film is generally undeflected. The lower peel roll 34 is spring biased for engaging the upper peel roll 32. However, when the system is at rest the lower peel roll 34 is separated from the upper peel roll 32 and is secured in position by the peel roll cam 33 carried by gear 48. In this way, the cam 33 maintains the upper and lower peel rolls 32 and 34 separated thereby establishing the open nip 37.

In order to gently break the tab 22, the film 10 is first secured in position. This is accomplished by driving gear 48 clockwise, and thereby moving the cam 33 away from the shaft 35 whereby the nip 36 closes on the film securing or capturing it in position. The cam 33 is activated by the motor drive pinion 47 which drives gear 48. As the cam 33 rotates (clockwise) away from the shaft 31, the spring loaded lower peel roll 34 is released for engagement with the upper peeler roll 32 closing the nip 36 on the film (FIGS. 3–4). The film 10 is thus captured and secured in position, and the infeed rolls 56 and 58 may be disengaged. The frame 42 which is driven by motor 45 via gears 47, 48, 49 carries the torque roll 40 towards the break position B into abutment with the tab 22. As the torque roll 40 gently engages the film 10, the tab 22 is bent towards the upper peel roll 32 placing tension on the score line 24 and causing the tab to break as it is captured between the torque roll 40 and the upper peel roll 32. The frame 42 comes to rest at the break position B with the broken tab and the attached peel sheet 14 thus captured (FIGS. 4–5). Also, in FIG. 5, the tab 22 has been broken away from the substrate 12, with the result that the leading edge of the substrate 12 is now established along the fractured score line 24.

It can be observed that the deflector roll 46 is positioned on the roller frame in fixed relation with the torque roll 40. In FIG. 3, the deflector 46 is below the undeflected film. In FIG. 5, the deflector 46 is above the film 10.

In order to achieve uniform peel characteristic and avoid observable artifacts in the resulting image, it is important to establish a peel geometry between the substrate and the peel sheet. This geometry is illustrated in FIG. 8 and the sequence is illustrated in FIGS. 5–7. The upper and lower peel rolls 32 and 34 are activated to advance the substrate by a selected amount so that the leading edge 24 is below the deflector roll 45 in an undeflected condition (shown as a phantom). The motor 46 is then reversed causing the frame 42 to move clockwise whereby the deflector roll 46 is moved against the substrate 12 to thereby urge it downward as shown in a deflected condition (shown in solid lines). The angle formed between the substrate in the undeflected condition and in the deflected condition, defines the deflection angle Θ. This angle may be adjusted to suit the peel characteristics of the film 10 as the substrate 12 and the peel sheet 14 are advanced.

After it is established, the torque roll 40 and the lower peel roll 34 are again activated. The motor 35 operates the lower peel roll 34 at constant speed (counterclockwise) for drawing the film 10 through the nip 36. The torque roll 40 operating at constant torque maintains a constant pull on the peel sheet 14 for separating the same from the substrate 12 and the adhered image layer 16.

FIG. 13 illustrates the peeler apparatus 30 of the invention in greater detail. A main support frame 130 comprising an inboard side plate 132 and a similar outboard plate (not shown) are secured in spaced apart relation.

The roller frame 42 likewise comprises an inboard plate member 134 and a similar outboard plate (not shown) mounted in spaced apart relation. The roller frame 42 is rotatably secured to the frame 130 by pivot shaft 44, as illustrated. One or both of the plate members 134 may be provided with a gear element 49 machined in a marginal edge, as illustrated. The gear 48 is secured to the stationary frame member 130 for rotation about a fixed axis. The gear 48 mates with the sector gear 49 and carries with it the cam 33 which engages the shaft 35 of the lower peel roll 34. Thus, as the stepping motor 45 and pinion 47 drives gears 48 and 49, the frame 42 is caused to move between the home H and the brake B positions. As the gear 49 rotates clockwise, the cam 33 releases the lower peel roll 34 for engagement with the upper peel roll 32 at the nip 37.

The frame 42 carries a home sensor flag 140 for engaging the home sensor 50, and likewise carries the brake sensor flag 142 for engaging brake sensor 52. The home sensor 50 and brake sensor 52 are each mounted in a corresponding block 144 and 146 secured to the plate 130. Each block has a corresponding slot 147 and 148 to receive the corresponding flag. The blocks 144 and 146 establish the corresponding abutments 51 and 53 between the roller frame 42 and plate 134.

The home and break position sensors 50 and 52, corresponding sensor flags 140 and 142, the blocks 144 and 146 and the abutments 51 and 53 are designed to allow the frame 42 to arrive at the extreme home and break positions with a soft stop. This occurs because the detectors 50 and 52 sense the sensor flags 140 and 142 as the enter the corresponding slot 147 and 148 in the blocks 144 and 146 upstream of the final stop position, represented by the abutment surfaces 51 and 53. There is a finite distance along which the flag may move as it enters the slot in the corresponding sensors 50 and 52. Thus, a signal from the sensor detecting a flag may be coupled to the encoder for the motor 45 which decelerates the frame 42 prior to reaching the abutment. Thus, the system is designed to decelerate the frame to a relatively soft but predictable stop position.

According to another feature of the invention, the brake stop abutment 53 establishes a reference for positionment of the deflector roll 46. When the frame 42 abuts the stop 53, the relative position of the deflector roll is established. Thus, by reversing the motor 45 by a selected number of counts, the deflector roll 46 may be precisely positioned with respect to the substrate. Further, the motor encoder may be reprogrammed if desired, to change the deflector angle if the peel characteristic of the film changes. Other motor encoders mentioned herein may be selectively programmed as conditions require.

As illustrated in FIG. 13, the peel sheet transport 160 comprises a pair of confronting O-ring conveyors 162 adapted to capture the tab 22 and the peel sheet 14 therebetween. An O-ring conveyor 164 at the outlet 166 of the conveyor 162 receives the peel sheet therefrom for disposal downstream.

It is possible to place a plurality of optical sensors, not shown, anywhere along the path of the film in the apparatus of the invention. Such sensors may be employed to detect the relative position of the film 10 with respect to any fixed position. For example, rather than using the optical sensor 100 at the inlet end of the infeed chute, it is possible to use an optical sensor near the outlet as well. Also, depending upon the length of the film, one or more sensors may be employed along the film path at intervals less than a full film length so as to unambiguously determine the position of the film within the system.

Likewise, in accordance with the invention, the tab 22 does not encounter any hard stop or abutment before it is captured between the torque roll 40 and the peel 34. Thus, premature, shock induced delamination is avoided.

The system also provides an advantage that the tab breaking and peel initiation all occur downstream of the peel nip 36, and likewise, all of these operations occur within the margin area 28 of the film outside of the image area 26. This assures that if an artifact does occur, it will confined to the margins and will not interfere with the image interpretation.

The present invention has a number of advantages over the described prior arrangements. For example, the film and the peel sheet and the substrate are always moved in the upstream direction. That is, the film direction is not reversed. This protects against also prevents propagation of artifacts. For example, if a portion of the film delaminates downstream of the nip 37, and if the film direction is reversed so that the delaminated portion is positioned momentarily upstream of the nip, then the nip will trap the delaminated portion and cause the delamination to propagate in the upstream direction which can cause an undesired artifact.

The torque roll 40 positively engages the tab 22 and captures it between itself and peel roll, and then operates with a constant torque to prevent the peel sheet 14 from bunching up in the mechanism. By maintaining a constant torque on the torque roll 40 and by governing the speed of the lower peel roll 34, the peel sheet 14 and the substrate 12 cannot move faster than the peel sheet can be stripped from the substrate. This provides a controlled peel characteristic and prevents jamming.

While there has been described what at present is considered to be the preferred embodiment of the present invention, it will be apparent to those skilled in the art that various changes may be made therein without departing from the invention and it is intended in the appended claims to cover such changes and modifications as fall within the true spirit and scope of the invention.

What is claimed is:

1. An apparatus for separating layers of a laminated thermographic media formed of a thermally sensitive substrate, an overlying laminated disposable peel sheet and an intermediate adhesive image forming layer, the substrate having a frangible substrate tab located between a score line in a free surface of the substrate and an adjacent marginal edge of the media comprising:

peel roll means including upper and lower peel rollers for peeling the media therebetween and for defining a nip;

means for advancing the media to a first position relative to the nip with the tab adjacent a leading edge of the substrate and the score line extending beyond the nip;

means for engaging the free surface of the substrate near the leading edge and urging the tab against the upper roller of the peel roll means for fracturing the substrate along the score line;

said engaging means being operable for advancing the peel sheet for further separating the substrate from peel sheet and attached tab, said engaging means and said peel roll means being operable cooperatively for preventing the peel sheet from moving slower than the substrate of the media; and, deflecting means mounted for movement with said engaging means on a movable frame which is free to move relative to the upper and lower peel rollers after the nip is formed wherein both of said deflecting means and said engaging means are movable with said frame independently relative to the lower peel roller of said peel roll means such that said engaging means bends and breaks the tab against the upper peel roller in response to said frame travelling to a tab break position wherein said deflecting means engages the substrate for deflecting the substrate from a first undeflected path to a second deflected path; wherein the deflected path establishes a selected deflection angle between the deflected and undeflected paths.

2. The apparatus of claim 1 wherein the peel roll means advances the separated substrate along the deflected path, said deflector being rotatably retractable for bending the substrate away from the undeflected path.

3. The apparatus of claim 1 wherein the peel means for advancing the media comprises a constant speed drive.

4. The apparatus of claim 1 wherein the engaging means for advancing the peel sheet comprises a constant torque drive.

5. An apparatus for separating layers of a laminated media formed of a substrate layer, an overlying laminated disposable peel sheet, and an intermediate adhesive image forming layer, the substrate having a frangible substrate tab located between a score line in a free surface of the substrate and an adjacent marginal edge of the media comprising:

a pair of peel rolls selectively engagable to form an open and closed nip for receiving the media therebetween;

means for advancing the media between the separable peel rolls with the tab located a selected distance beyond the nip; and tab breaking roll means rotatably movable relative to the peel rolls for engaging the tab adjacent the score line and for urging the tab against one of the peel rolls to thereby create tension in the free surface of the substrate to cause failure of the substrate along the score line and to separate the tab from the substrate downstream of the peel rolls; the means for engaging the media is operable when the peel nip is open; wherein the means for advancing the media includes means operable between open and closed positions to engage and disengage said media; and wherein the means for engaging peel rolls to form the closed nip is operable after the means for engaging the media is disengaged.

6. The apparatus of claim 5 further including means for engaging the peel rolls to form the closed nip prior to engaging the tab breaking roll means.

7. The apparatus of claim 5 further including means for advancing the captured peel sheet between the tab breaking roll means and the peel roll.

8. The apparatus of claim 5 further including deflector means adjacent the tab breaking roll means and movable therewith for engaging the substrate opposite the free surface.

9. The apparatus of claim 8 further including means for selectively positioning the deflector means against the said opposite surface for deflecting the substrate away from the peel sheet to a selected deflector angle.

10. The apparatus of claim 5 further including means operable for sensing a leading edge of the media, and for producing an output signal corresponding to the position of the said leading edge.

11. The apparatus of claim 10 wherein the means for sensing the leading edge of the media comprises an optical sensor.

12. The apparatus of claim 10 wherein the means for advancing the media includes a motor drive responsive to an encoded input signal.

13. The apparatus of claim 12 further including means responsively coupled to the means for advancing the media for producing the encoded input signal.

14. The apparatus of claim 13 wherein the means for producing the encoded input signal comprises a counter for sensing counts of the encoded input signal.

15. The apparatus of claim 12 further including deflector means for engaging the media downstream of the capturing means for deflecting the media therein.

16. The apparatus of claim 12 wherein the means for advancing the media is operative to advance the deflected media.

17. The apparatus of claim 12 further including deflector means for selectively engaging the media downstream of the capturing means for deflecting the media therein and wherein the deflected media establishes a selected deflector angle between the deflected and undeflected media.

18. The apparatus of claim 5 further including anti-skew means located upstream of the peel rolls for orienting a leading edge of the media parallel with the nip.

19. The apparatus of claim 18 wherein the anti-skew means comprises cams located in the media path upstream of the nip;

means for sensing the position of the media relative to the cams;

means responsive to the sensing means for releasing the media in response to sensing the media in a selected position in the path when said media is upstream of the cams; and means associated with the cams for supporting the released media with the leading edge parallel to the nip.

20. The apparatus of claim 5 further including means for securing the peel rolls apart and for releasing the peel rolls to form the nip.

21. An apparatus for separating layers of a laminated media formed of a substrate layer, an overlying laminated disposable peel sheet, and an intermediate adhesive image forming layer, the substrate having a frangible substrate tab located between a score line in a free surface of the substrate and an adjacent marginal edge of the media comprising:

a pair of peel rolls selectively engagable to form an open and closed nip for receiving the media therebetween;

means for advancing the media between the separable peel rolls with the tab located a selected distance beyond the nip;

tab breaking roll means rotatably movable relative to the peel rolls for engaging the tab adjacent the score line and for urging the tab against one of the peel rolls to thereby create tension in the free surface of the substrate to cause failure of the substrate along the score line and to separate the tab from the substrate downstream of the peel rolls; means for securing the peel rolls apart and for releasing the peel rolls to form the nip; and, peel rolls are spring biased to form the closed nip and the means for securing the peel rolls apart comprises a cam for engaging at least one of the peel rolls against the spring bias to form the open nip.

22. An apparatus for separating layers of a laminated thermographic media formed of a thermally sensitive substrate, an overlying laminated disposable peel sheet and an intermediate adhesive image forming layer, the substrate having a frangible substrate tab located near an edge along a score line in a free surface of the substrate adjacent a marginal edge of the media comprising:

means for capturing the media therebetween;

means for advancing the media to a first position within the capturing means with the tab adjacent a leading edge of the substrate and the score line extending beyond the capturing means;

tab breaking means for engaging the free surface of the substrate near the leading edge and urging the tab against the capturing means for fracturing the substrate along the score line;

deflector means independently operable relation to the tab breaking means for deflecting the substrate from a first undeflected path to a second deflected path;

means supporting tab breaking means and deflector means for relative motion with respect to the capturing means;

wherein the support means comprises a frame rotatable with respect to the capturing means;

means for selectively driving a frame at a selected rate between extreme positions;

sensor means for sensing proximity of the frame to the extreme positions; and, including means responsively coupled between the drive means and the sensor means for reducing the drive rate when the frame is proximate the extreme positions.

23. The apparatus of claim 22 wherein the deflected path establishes a selected deflector angle between the deflected and undeflected paths.

24. The apparatus of claim 22 wherein the means coupled between the sensor means and drive means comprises an encoder responsive to the sensor for governing the drive means.

25. The apparatus of claim 22 wherein at least one of said extreme positions establishes a reference for the frame further including means operatively coupled to the frame and responsive to the reference for selectively establishing at least one intermediate position between the extreme positions.

26. An apparatus for separating layers of a laminated media one of said layers having a frangible tab located along a score line in a free surface of said layer adjacent a marginal edge of the media comprising:

a pair of upper and lower peel rolls selectively engagable to form a nip for receiving the media therebetween;

means for advancing the media along a path between the separable peel rolls with the tab located a selected distance beyond the nip and parallel therewith;

tab breaking means rotatably movable relative to the peel rolls along a selected path for engaging the free surface of the tab adjacent the score line and for urging the tab against said upper peel roll to thereby create tension in the free surface of the substrate to cause failure of the substrate along the score line and to separate the tab from the substrate downstream of the peel rolls;

anti-skew means located upstream of the peel rolls for orienting a leading edge of the media parallel with the nip including cams located in the media path upstream of the nip;

means for sensing the position of the media relative to the cams;

means responsive to the sensing means for releasing the media in response to sensing the media in a selected position in the path when said media is upstream of the cams; and means associated with the cams for supporting the released media with the leading edge parallel to the nip; and, deflecting means mounted for movement with said breaking means on a movable frame which is free to move relative to said upper and lower peel rolls after the nip is formed wherein both of said deflecting means and said breaking means are movable with said frame independently relative to said lower peel roll such that said breaking means engages the tab and bends and breaks it against said upper peel roll in response to said frame travelling to a tab breaking position, wherein said deflecting means engages the substrate for deflecting the substrate from a first undeflected path to a second deflected path; wherein the deflected path establishes a selected deflection angle between the deflected and undeflected paths.

\* \* \* \* \*